(12) United States Patent
Yoshikawa

(10) Patent No.: US 7,466,634 B2
(45) Date of Patent: Dec. 16, 2008

(54) MAGNETIC FIELD GENERATOR AND PHOTOMAGNETIC INFORMATION STORAGE APPARATUS

(75) Inventor: Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 933 days.

(21) Appl. No.: 11/029,427

(22) Filed: Jan. 6, 2005

(65) Prior Publication Data
US 2005/0105403 A1 May 19, 2005

Related U.S. Application Data

(63) Continuation of application No. PCT/JP02/13704, filed on Dec. 26, 2002.

(51) Int. Cl.
*G11B 11/00* (2006.01)
(52) U.S. Cl. ..................... 369/13.23; 360/59
(58) Field of Classification Search .......... 369/13.05, 369/13.13, 13.22, 13.23, 13.25, 13.51, 13.54, 369/116, 13.18, 13.14; 360/59, 114.01, 114.02
See application file for complete search history.

(56) References Cited

U.S. PATENT DOCUMENTS

| | | | | |
|---|---|---|---|---|
| 5,363,353 A | * | 11/1994 | Kim et al. | 369/13.18 |
| 5,903,525 A | * | 5/1999 | McDaniel et al. | 369/13.23 |
| 6,760,278 B2 | * | 7/2004 | Matsumoto et al. | 369/13.17 |
| 7,127,729 B2 | * | 10/2006 | Kawasaki et al. | 720/671 |

FOREIGN PATENT DOCUMENTS

| | | |
|---|---|---|
| EP | 1085505 | 3/2001 |
| JP | 5-225501 | 9/1993 |
| JP | 7-6443 | 1/1995 |
| JP | 9-35937 | 2/1997 |
| JP | 10-320863 | 12/1998 |
| JP | 2000-36141 | 2/2000 |
| JP | 2000-90403 | 3/2000 |
| JP | 2002-230860 | 8/2002 |

OTHER PUBLICATIONS

European Search Report dated Oct. 5, 2005 in corresponding European Application No. 02792024.8.

* cited by examiner

*Primary Examiner*—Ali Neyzari
(74) *Attorney, Agent, or Firm*—Staas & Halsey LLP

(57) ABSTRACT

An object is to provide a magnetic field generator permitting fabrication by a simple manufacturing technique, such as plating, and capable of suppressing the generation of an eddy current as well as a photomagnetic information storage apparatus capable of high speed data recording and reproduction. It has an annular coil 311 surrounding an inner hole, and a plurality of magnetic rods 312 radially disposed centering on the inner hole of the coil 311 so as to overlap the coil 311, insulated from the coil 311 and consisting of a magnetic material, the maximum width of each rod being not more than twice the minimum width.

13 Claims, 10 Drawing Sheets

MAGNETIC FIELD GENERATOR AND PHOTOMAGNETIC INFORMATION STORAGE APPARATUS

CROSS REFERENCE TO RELATED APPLICATIONS

This application is a continuing application, filed under 35 U.S.C. §111(a), of International Application PCT/JP2002/013704, filed Dec. 26, 2002, the contents of which are hereby incorporated by reference.

TECHNICAL FIELD

The present invention relates to a magnetic field generator that generates magnetic fields and a photomagnetic information storage apparatus that accesses information stored in an information recording medium by using light and magnetic fields.

BACKGROUND ART

Information recording media including CD, CD-ROM, CD-R, DVD, PD, MO and MD are already extensively used as large-capacity recording media that store audio signals and video signals. Especially, photomagnetic information recording media, information in which can be accessed by using light and magnetic fields, are attracting keen interest as high-density recording media permitting rewriting of information, and research and development attempts are actively made to achieve an even greater recording density. Research and development pursuits are also actively undertaken on photomagnetic information storage apparatus that reproduce information from and store information into such photomagnetic information recording media at high speed.

Whereas conventional photomagnetic information storage apparatus use the optical modulation system by which information is recorded on recording media by optical modulation according to information, a more recent trend developing along with the increase in recording density is to use, instead of the conventional optical modulation system, a magnetic field modulation system by which information is recorded by magnetic field modulation according to information. In a common photomagnetic information storage apparatus using the magnetic field modulation system, magnetic fields modulated by using a thin film coil fabricated by a semiconductor process are generated.

In a photomagnetic information storage apparatus using the magnetic field modulation system, the temperature of the recording film of the recording medium is brought close to the Curie point by focusing on the film a laser beam for record use, and applying in that state the magnetic fields generated by a coil onto the recording film. The magnetizing direction of the recording film is thereby oriented according to the information, which is thereby recorded on the film.

In order to execute at high speed recording and reproduction of a large quantity of data with a photomagnetic information storage apparatus using such a magnetic field modulation system, it is preferable for the device to have a front illumination type configuration in which the optical system that focuses light on the recording medium and the magnetic coil that generates the magnetic field are arranged on the same side as viewed from the recording medium. Usually an annular magnetic coil is arranged between the optical system and the recording medium in such a configuration.

Further, in order to enhance the efficiency of generating magnetic fields, a configuration in which a magnetic substance layer functioning as the core of a magnetic coil is disposed between the magnetic coil and the optical system is known to be effective. For instance, Patent Reference 1 discloses a case in which a disk-shaped magnetic substance layer having a hole at the center is provided.

(Patent Document 1)
Japanese Patent Laid-Open No. 10-320863

When the magnetic coil is driven at a high frequency (e.g. 50 MHz) where such a magnetic layer is disposed, an eddy current accompanying variations in the magnetization of the magnetic layer will be generated within the magnetic layer, and this eddy current becomes a loss and invites a rise in the temperature of the magnetic substance. This temperature rise results in an increase in the temperature of the magnetic coil and, in an extreme case known as migration in which the magnetic coil becomes very thin, possibly culminating in a wiring cut-off. The rise in magnetic coil temperature also increases the resistance of the magnetic coil, leading to damage to the magnetic coil due to heat.

As a technique to reduce such a loss due to an eddy current, it is proposed to form the magnetic layer in multiple sublayers of thin films. However, as the fabrication of such a magnetic layer of a thin film multilayered structure, such sophisticated manufacturing techniques as vacuum vapor deposition and sputtering are required, and accordingly involves an increase in production cost and a drop in productivity.

DISCLOSURE OF THE INVENTION

An object of the present invention, attempted in view of the circumstances described above, is to provide a magnetic field generator permitting fabrication by a simple manufacturing technique, such as plating, and capable of suppressing the generation of an eddy current as well as a photomagnetic information storage apparatus capable of high speed data recording and reproduction.

In order to achieve the object stated above, a magnetic field generator according to the present invention is characterized in that it has:

an annular coil surrounding an inner hole, and plural magnetic rods which are insulated from the coil, have a magnetic material, are arranged radially around the inner hole of the coil so as to overlap the coil and have a ratio of not greater than 2/1 between the maximum width and the minimum width.

In the magnetic field generator according to the present invention, the magnetic field generated by the coil is reinforced by the magnetic rods and at the same time the rod-shaped structure of the magnetic rods serves to keep the loss due to an eddy current low. Furthermore, the rod-shaped structure of the magnetic rods can be fabricated by a simple manufacturing technique, such as plating, and the manufacturing cost is also reduced.

In the magnetic field generator according to the present invention, preferably the magnetic rods should be made of a magnetic material having a saturated magnetic flux density of 1.5 (T) or more, and should be 3 μm or more in thickness and 6 μm or more in width.

Magnetic rods of such dimensions can help reduce the eddy current loss effectively, and yet their magnetic flux density of 1.5 (T) or more ensures a sufficient magnetic field generating capability.

Also, in the magnetic field generator according to the present invention, preferably the magnetic rods have a length at least twice as great as the width of the coil from the line of the inner hole thereof to the outer line.

Magnetic rods having such a length can efficiently strengthen the magnetic field generated by the coil.

Further, in the magnetic field generator according to the present invention, preferably the total volume of the plural magnetic rods should be smaller than the total volume of the spaces between the plural magnetic rods.

Where the total volume of the magnetic rods is restricted in this way, the diamagnetic field arising in the magnetic rods against the magnetic field generated by the coil is smaller, and accordingly the magnetization in the magnetic substance of the magnetic field generator is greater.

In the magnetic field generator according to the present invention, preferably the magnetic rods should have wider parts in the positions they overlap the coil.

By having such wider parts, the magnetic rods can efficiently strengthen the magnetic field.

In the magnetic field generator according to the present invention, preferably the magnetic rods should be made of a magnetic material having a magnetic permeability of 500 or more.

In order to realize a reduction in the loss due to an eddy current by the sufficiently thin rod-shaped structure while enabling it to fully perform the function of strengthening the magnetic field, which is the essential function of magnetic rods, it is preferable to use a magnetic material having a high magnetic permeability of 500 or more.

In the magnetic field generator according to the present invention, the magnetic rods are typically made of CoNiFe.

In the magnetic field generator according to the present invention, preferably an extra-coil radiator that deprives the magnetic rods of heat should be provided in thermal contact with the magnetic rods in a position where ⅙ or more of the outer diameter of the coil is opened from the outer edge of the coil.

The deprivation of the magnetic rods of heat by such an extra-coil radiator helps further improve the thermal performance of the magnetic field generator.

In the magnetic field generator according to the present invention, the extra-coil radiator is typically made of copper.

In the magnetic field generator according to the present invention, preferably there should be further provided inter-rod radiators disposed between the plural of magnetic rods, insulated from and being in thermal contact with the magnetic rods and intended to deprive the magnetic rods of heat.

Since such inter-rod radiators also deprive the magnetic rods of heat, the thermal performance of the magnetic field generator is enhanced.

In the magnetic field generator according to the present invention, the inter-rod radiators are typically made of copper.

In the magnetic field generator according to the present invention, preferably an extra-coil radiator, connected to the inter-rod radiators, that deprives the magnetic rods of heat via the inter-rod radiators should be provided in a position where ⅙ or more of the outer diameter of the coil is opened from the outer edge of the coil.

In the magnetic field generator of such a configuration, the magnetic rods are deprived of heat by the inter-rod radiators, and the heat is efficiently transferred to the extra-coil radiator and radiated outward by the extra-coil radiator. The thermal performance of the magnetic field generator is thereby further enhanced.

In order to achieve the object stated above, a photomagnetic information storage apparatus according to the present invention which accesses an information recording medium for information by using light and magnetic fields is characterized in that it has:

a light source which emits light;

a condensing lens that condenses the light emitted from the light source on the information recording medium;

an annular coil surrounding an inner hole, disposed on the information recording medium side of the condensing lens and causing a magnetic field to be generated on the information recording medium in a position where the condensing lens condenses light; and plural magnetic rods radially arranged centering on the inner hole of the coil between the coil and the condensing lens, insulated from the coil, and made of a magnetic material, the maximum width of each rod being not more than twice the minimum width.

Although only the basic form of the photomagnetic information storage apparatus according to the present invention is shown here, this is merely to avoid duplication, and the photomagnetic information storage apparatus according to the present invention is not limited to this basic form, but includes any form matching every form of the magnetic field generator described above.

BEST MODE FOR CARRYING OUT THE INVENTION

Modes for carrying out the present invention will be described below.

Figure 1:
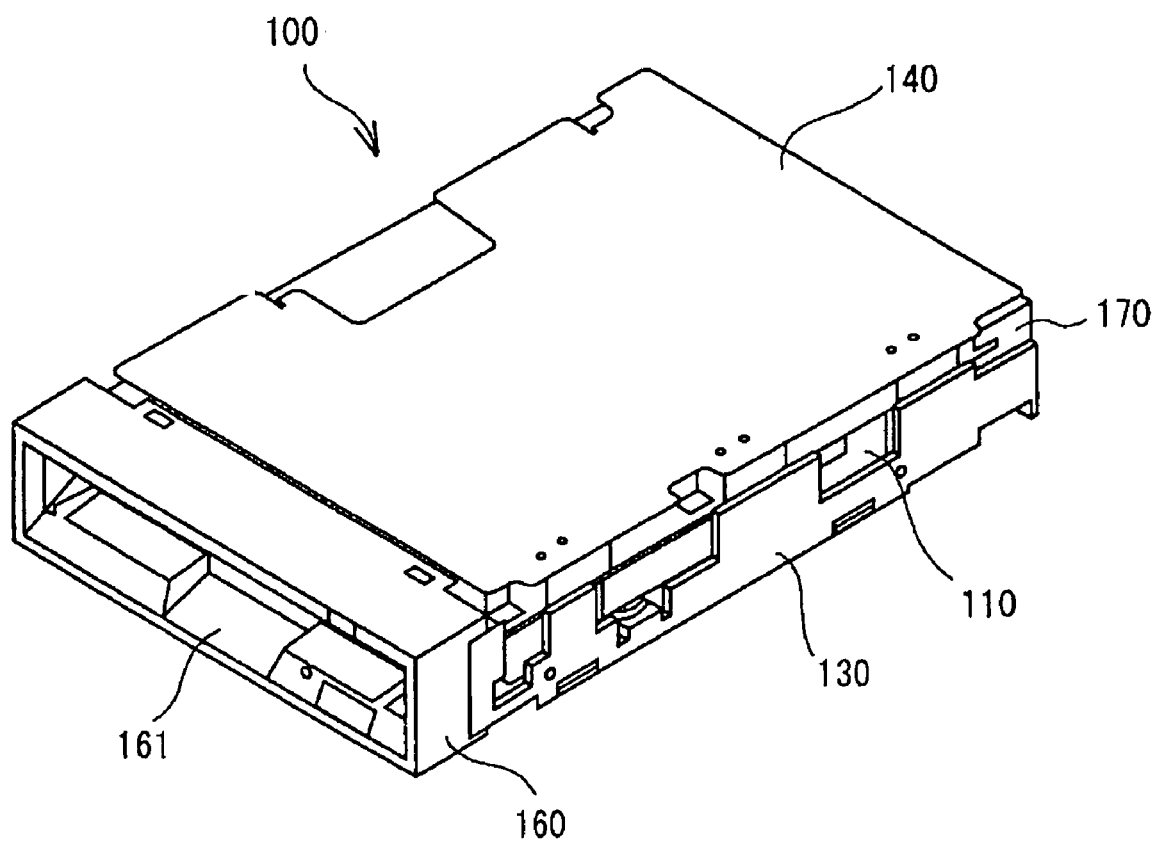
FIG. 1 shows a photomagnetic information storage apparatus in one mode for carrying out the present invention into which a magnetic field generator in one mode for implementing the present invention is incorporated.

FIG. 1 shows a photomagnetic information storage apparatus in one mode for carrying out the present invention into which a magnetic field generator in one mode for implementing the present invention is incorporated.

A photomagnetic information storage apparatus 100 illustrated here is provided with an aluminum alloy-made drive base 110, which constitutes the base of the photomagnetic information storage apparatus 100, and the drive base 110 is fitted to a frame 130. Further onto the drive base 110, a top cover 140 and a bottom cover (not shown) are screwed.

To the frame 130, a front panel 160 is fitted, and this front panel 160 has an insertion slit 161 through which an MO disk cartridge with a photomagnetic (MO) disk built into it, which corresponds to one example of information recording medium in the context of the present invention, is to be inserted into the photomagnetic information storage apparatus 100.

At the rear end of the photomagnetic information storage apparatus 100, as opposed to its front end where the front panel 160 is fitted, a connector 170 for electrical connection of the photomagnetic information storage apparatus 100 to a device, such as a computer, is provided.

Within the photomagnetic information storage apparatus 100, there are mounted a spindle motor that holds and turns a MO disk and a head that records and reproduces information by irradiating the MO disk with light or applying a magnetic field to it.

Figure 2:
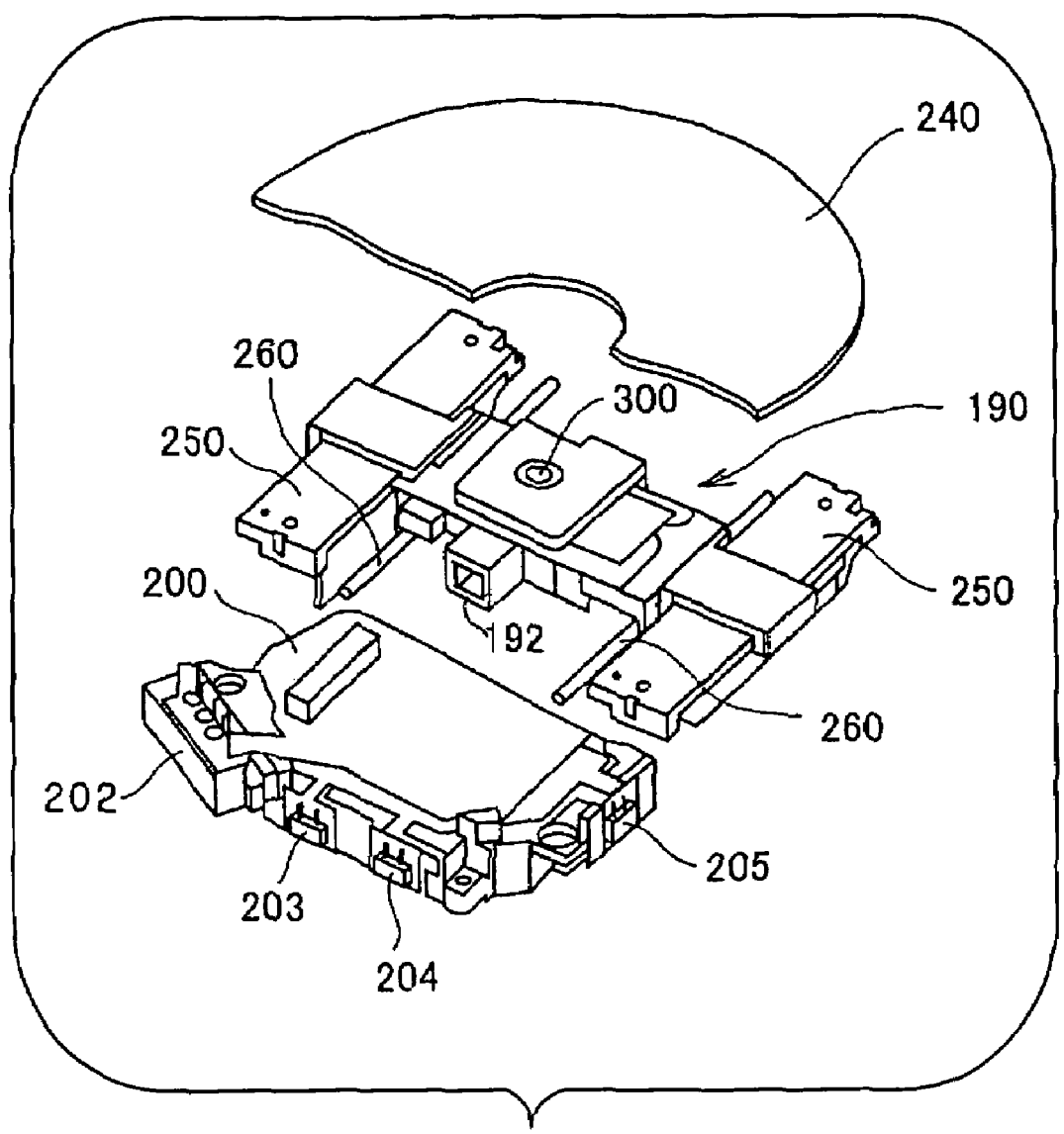
FIG. 2 is a perspective view showing the configuration of the head.

FIG. 2 shows the configuration of the head.

The head is configured of a movable assembly 190 movable in the radial direction of an MO disk 240 and a fixed assembly 200 fixed to the drive base 110 shown in FIG. 1.

The fixed assembly 200 contains a laser diode 202, which is one example of light source in the context of the present invention and generates a laser beam for use in reading and writing information, an optical detector 203 that detects signals contained in the beam reflected by the MO disk 240 and corresponding to information stored in the MO disk 240, an optical detector 204 that detects any deviation in light condensing spots on tracks many rounds of which are spirally disposed on the MO disk as places where information is stored, and an optical detector 205 that detects any focusing deviation of any of the light condensing spots.

The movable assembly 190, driven by a pair of magnetic circuits 250 moves in the radial direction of the MO disk 240 along a pair of guide rails 260. Over the movable assembly 190, there are mounted, among other elements, a condensing lens 300 that condenses the light beam on the MO disk 240, a magnetic coil that generates a magnetic field in the position of light spotting by the condensing lens, and an actuator that adjusts the focus of the condensed light spot and positioning the condensed light spot on the tack by fine adjustment of the condensing lens 300. The fine positional adjustment of the condensing lens 300 by the actuator is accomplished on the basis of deviations detected by the optical detectors 204 and 205.

The movable assembly 190 is provided with a nozzle 192 having a rectangular section, and a laser beam emitted from the laser diode 202 of the fixed assembly 200 enters into the movable assembly 190 through this nozzle 192. Also, the beam reflected by the MO disk 240 returns into the fixed assembly 200 through this nozzle 192. Further inside the movable assembly 190 beyond the nozzle 192, there is a build-in turning mirror that brings the laser beam having entered through the nozzle 192 into incidence on the condensing lens 300.

Figure 3:
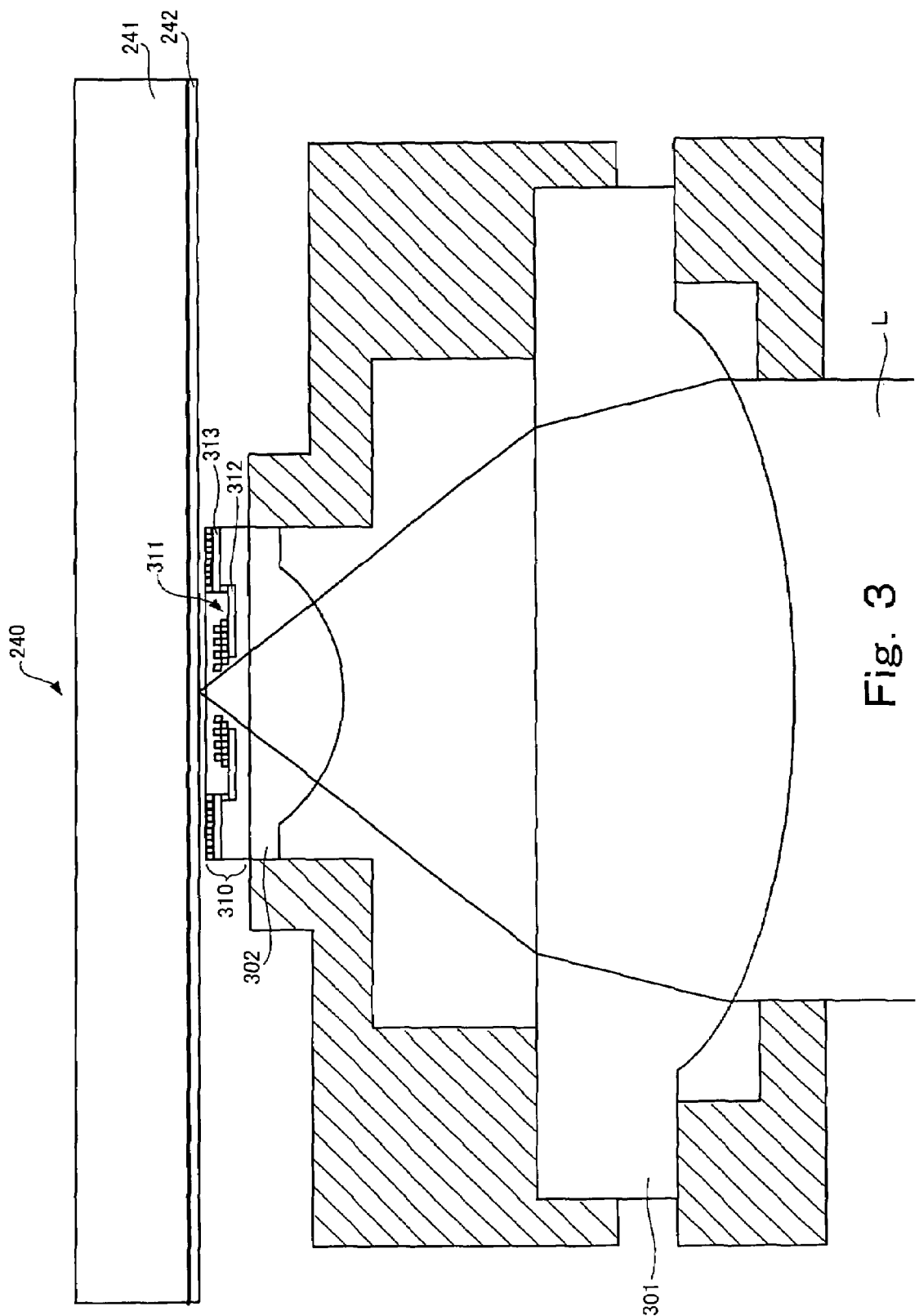
FIG. 3 is an enlarged view showing the peripheral part of a condensing lens 300 of a movable assembly.

FIG. 3 is an enlarged view showing the peripheral part of the condensing lens 300 of the movable assembly.

The MO disk 240 is configured of a substrate 241 and a recording layer 242, while the condensing lens is composed of a semispherical lens 301 and an a spherical lens 302. A laser beam L guided from the fixed assembly is condensed onto the recording layer 242 on the MO disk 240 via the semispherical lens 301 and the a spherical lens 302 to form a light spot.

On the MO disk 240 side of the a spherical lens 302, there is disposed a magnetism generating section 310 corresponding to one mode of realizing a magnetic field generator according to the present invention, and it generates a magnetic field perpendicular to the recording layer 242 in a position where the light condensing spot is formed on the recording layer 242.

In the position where the light condensing spot is formed on the recording layer 242, the temperature is raised to the Curie point by irradiation with the laser beam L, and the magnetic field generated by the magnetism generating section 310 orients the magnetizing direction of the domain in the recording layer 242 correspondingly to the information to be recorded. Information is thereby recorded onto the MO disk 240.

The magnetism generating section 310 has a coil 311, a magnetic core 312 and a radiator 313.

Figure 4:
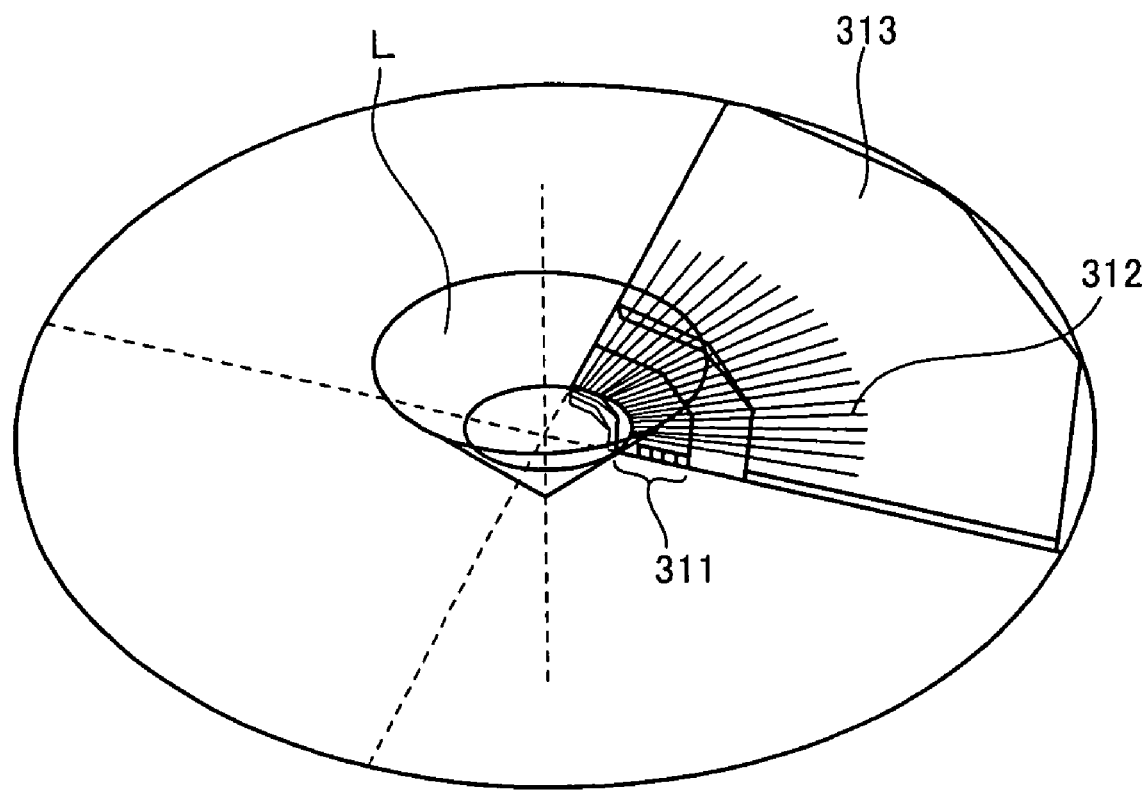
FIG. 4 shows a ¼ configuration of a magnetism generating section.
Figure 5:
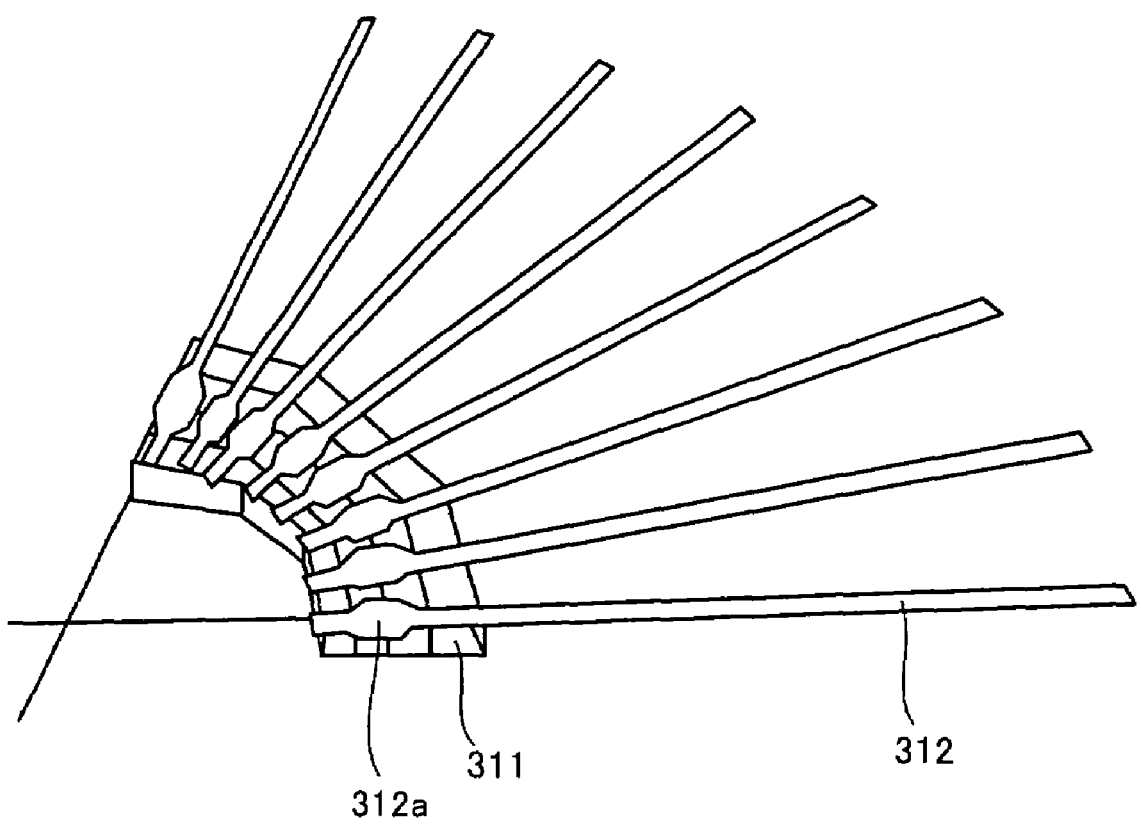
FIG. 5 is a partially enlarged diagram of the magnetism generating section.

FIG. 4 shows a ¼ configuration of the magnetism generating section, and FIG. 5 is a partially enlarged diagram of the magnetism generating section.

The coil 311 is one example of coil in the context of the present invention; it is a so-called thin-film coil having an annular shape surrounding an inner hole through which the laser beam L is to pass. The bore of the inner hole of this coil 311 is 200 µm and the outer diameter, 600 µm; therefore the width from the edge of the inner hole to the outer diameter is 200 µm. When recording information, a current varying in direction according to the information to be recorded is applied to the coil 311, and the maximum frequency of that current may reach or surpass 20 MHz, with the transfer speed of the data to be recorded taken into account. Thus, the current flowing to the coil 311 and the magnetic field generated by the coil 311 may be inverted rapidly in a short period of 50 ns or less.

The magnetic core 312 is one example of magnetic rods in the context of the present invention; it has CoNiFe and has a rod shape of 3 µm in thickness and 6 µm in width. The rods of this magnetic core 312 are radially arranged centering on the inner hole of the coil 311. The length of each element of the magnetic core 312 is 400 µm, twice the width from the edge of the inner hole of the coil 311 to the outer edge. The total volume of the magnetic core 312 is smaller than the total volume of the spaces between the rods of the magnetic core 312.

The magnetic lines of force of the magnetic field generated by the coil 311, guided by the radially arranged rods of the magnetic core 312, concentrate into the inner hole of the coil 311, resulting in an increased magnetic field intensity in the spot position on the MO disk. As CoNiFe constituting the magnetic core 312 is a magnetic material having a saturated magnetic flux density of over 1.5 T, the magnetic core 312 can sufficiently increase the magnetic field intensity. Further, whereas the magnetic core 312 gives rise to a diamagnetic field against the magnetic field generated by the coil 311, if this diamagnetic field is too intense, the internal magnetic field of the magnetic core 312 will attenuate to restrain the magnetization of the magnetic core 312 with the result of restraining the effect of the magnetic core 312 to increase the magnetic field intensity. The intensity of this diamagnetic field is determined by the structure of the magnetic core 312; in this mode for implementation, as the total volume of the magnetic core 312 is restrained by the rod shape of its elements, the diamagnetic field of the magnetic core 312 is weak and the magnetization is strong.

Each rod of the magnetic core 312 is provided with a wider part 312*a* where it overlaps the coil 311, and this contributes to further enhancement of the effect to increase the magnetic field intensity.

When the magnetic field generated by the coil 311 is rapidly inverted as mentioned above, a loss due to an eddy current occurs in each element of the magnetic core 312; in this mode for implementation, however, as each element of the magnetic core 312 is rod-shaped, the area of the section orthogonal to the magnetic lines of force is small, and accordingly the loss due to an eddy current and heating are restrained. As a result, even if the coil 311 is driven at a high frequency, power consumption by the coil 311 can be kept low, and a temperature rise in the coil 311 can be averted. As a result of this aversion of a temperature rise in the coil 311, the coil 311 is enabled to generate a stronger magnetic field. In order to reduce the loss due to an eddy current while maintaining a high level of magnetization, the rod shape of the elements of the magnetic core 312, of which the maximum width is not more than twice the minimum width, proves effective.

The radiator 313 is one example of extra-coil radiator in the contest of the present invention; in order to avoid the generation of an eddy current accompanying the inversion of the magnetic field generated by the coil 311, a distance of 100 µm, corresponding to ⅙ of the outer diameter of the coil 311, is secured in a position away from the outer edge of the coil 311. This radiator 313 is in thermal contact with each rod of the magnetic core 312 and deprives it of heat. The presence of this radiator 313 serves to further improve the thermal characteristics of the magnetic field generating section.

Now will be given a description by way of comparison of the magnetic field generating capacity of the aforementioned comparative example in which the magnetic core 312 has annual magnetic layers linked to each other and the magnetic field generating capacity in this mode for carrying out the invention.

Figure 6:
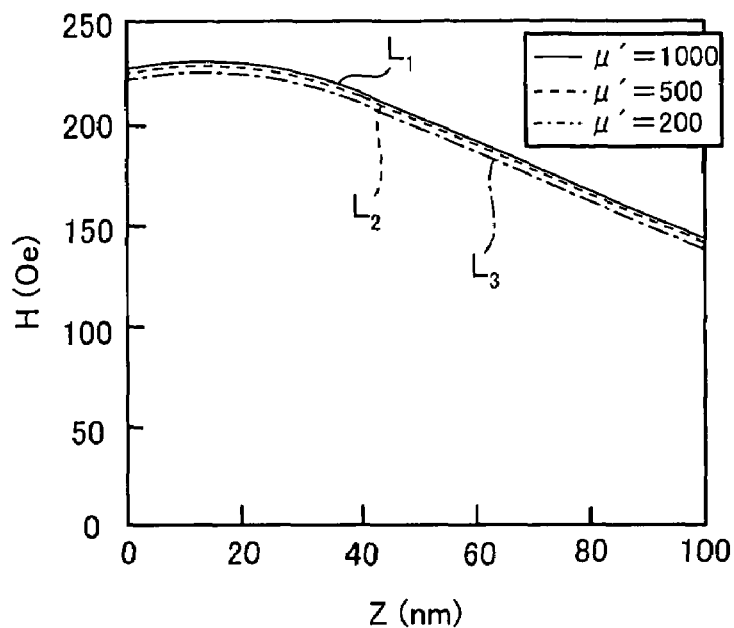
FIG. 6 is a graph showing the magnetic field generating capacity in a comparative example.
Figure 7:
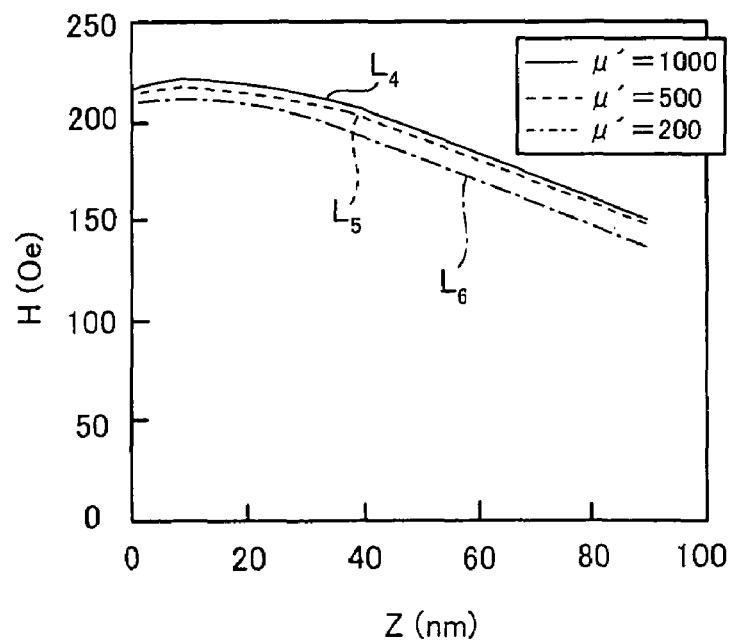
FIG. 7 is a graph showing the magnetic field generating capacity in this mode for implementation.

FIG. 6 is a graph showing the magnetic field generating capacity in the comparative example, and FIG. 7, a graph showing the magnetic field generating capacity in this mode for implementation.

The horizontal axes of these graphs represent positions on the central axis of the coil (i.e. the optical axis of the condensing lens) with reference to the center of the coil, while the vertical axes represent the intensity of the magnetic field. In the graphs, solid lines L1 and L4 indicate the magnetic field generating capacity where the magnetic core and the magnetic layer are formed of a magnetic material of 1000 in permeability ($\mu'$); broken lines L2 and L5, the magnetic field generating capacity where they are formed of a magnetic material of 500 in permeability ($\mu'$); and one-dot chain lines L3 and L6, the magnetic field generating capacity where they are formed of a magnetic material of 200 in permeability ($\mu'$).

In the graph of FIG. 6, though differing in permeability in the range of 200 to 1000, there hardly is a difference in magnetic field intensity. This means that, even though the permeability is high, the large diamagnetic field in the annular magnetic layer further increases accordingly, with the result that the magnetization of the magnetic layer remains substantially unchanged, and so does the intensity of the magnetic field.

By contrast in the graph of FIG. 7, where the permeability differs in the range of 200 to 1000, if it surpasses 500, a magnetic field intensity comparable to that in the comparative example can be achieved. This means that, as the diamagnetic field is small in the rod-shaped magnetic core, the magnetic field intensity rises with an increase in the permeability. In view of the essential purpose of the magnetic field generator, it is desirable for the magnetic field generating capacity of the magnetic field generator to be comparable to the magnetic field generating capacity of the comparative example; therefore it is preferable for the magnetic material to constitute the magnetic core to be higher than 500 in permeability. It is further relative to reduce the eddy current-induced loss with the rod shape while maintaining a level of magnetic field generating capacity comparable to the magnetic field generating capacity of the comparative example. In order to achieve a sufficient magnetic field generating capacity with a thin rod shape of 3 µm in thickness and 6 µm in width, preferably the material should have a saturated magnetic flux density of 1.5 or more. Magnetic materials having such a permeability and a saturated magnetic flux density include CoNiFe for instance. Though somewhat inferior in the aforementioned factors of permeability and saturated magnetic flux density, NiFe is another suitable magnetic material.

Next, the effect of the use of the rod-shaped magnetic core to reduce the eddy current-induced loss will be described.

Figure 8:
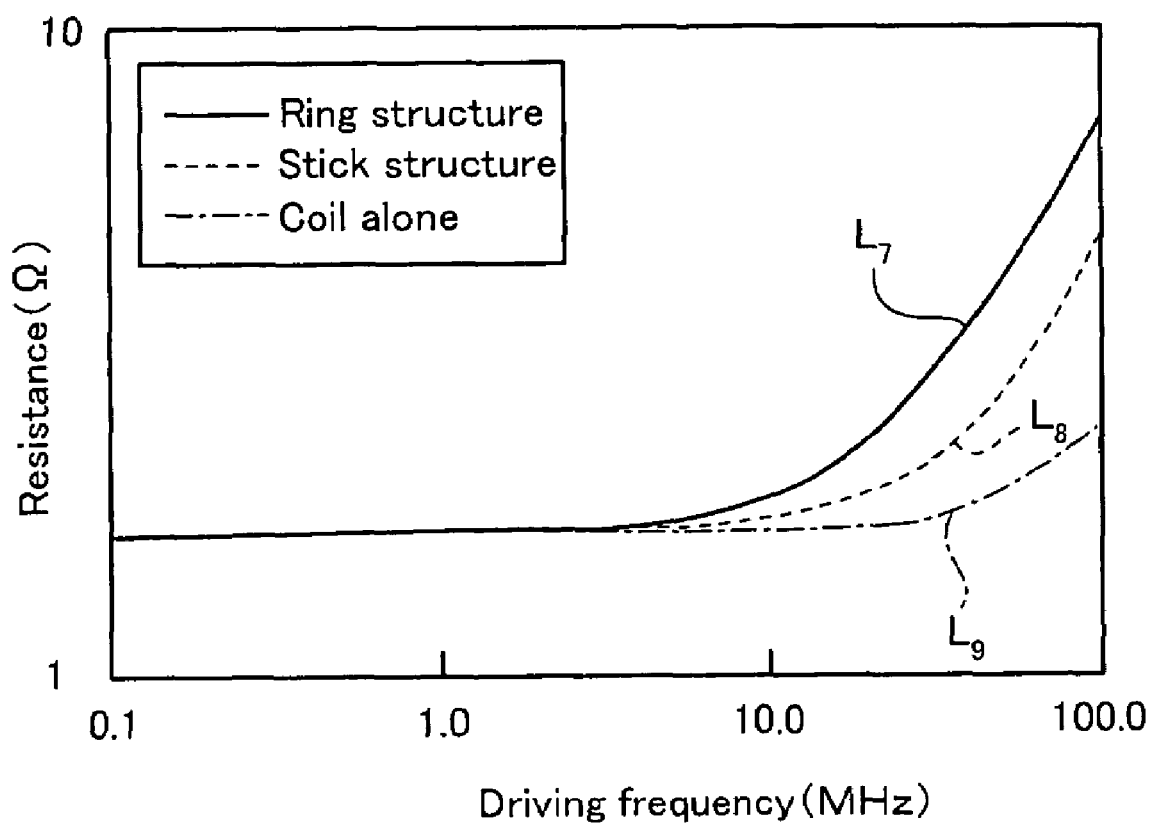
FIG. 8 is a graph showing the effect to reduce the loss due to an eddy current.

FIG. 8 is a graph showing the effect to reduce the loss due to an eddy current.

In this FIG. 8, the horizontal axis represents the drive frequency of the coil, and the vertical axis, the resistance resulting from the driving of the coil. Further, solid line L7 in this graph indicates the resistance arising in the comparative example mentioned above; broken line L8 in the graph, the resistance arising in this mode for carrying out the invention; and one-dot chain line L9 in the graph, the resistance arising only in a coil having no magnetic core or magnetic layer.

Where there only is a coil having no magnetic core or magnetic layer, obviously no eddy current arises, but a skin effect causes the resistance to start increasing in the vicinity of 100 MHz. In the comparative example, on the other hand, the resistance starts increasing rapidly in the vicinity of a few MHz, leading to a heavy eddy current-induced loss. Unlike these cases, in this mode for implementation, though the resistance begins to increase in the vicinity of a few MHz, it does so only gradually, which means an effect to reduce the eddy current-induced loss.

Next will be described a method of fabricating the magnetic core for use in this mode for carrying out the invention. Incidentally, as it is common knowledge that other constituent parts of the magnetic field generating section than the magnetic core can be fabricated by a semiconductor process using plating, exposure to light and the like, the description of their fabricating methods will be dispensed with.

Figure 9:
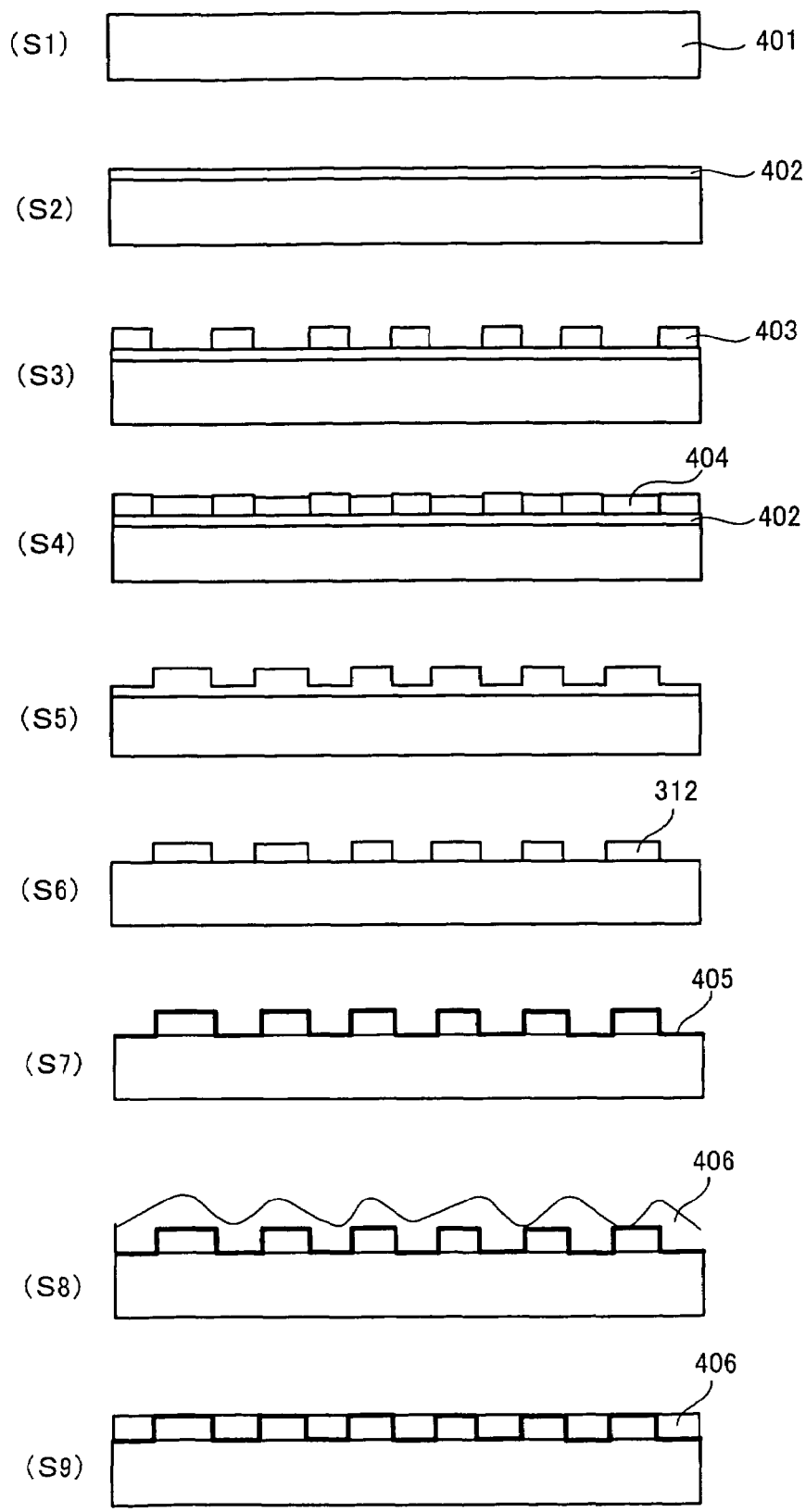
FIG. 9 illustrates a method of fabricating a magnetic core to be provided in this mode for implementation.

FIG. 9 illustrates the method of fabricating the magnetic core to be used in this mode for implementation.

First, what has a desired refractive index is selected as a glass substrate 401 (step S1), and a plated base (base) 402 to constitute a magnetic layer is formed over the glass substrate 401 by vacuum vapor deposition or sputtering (step S2). In this case, the thickness of the base 402 need not be more than a few nm to a few tens of nm.

This base 402 is coated with a resist 403, and exposure to light and development are performed by using a radially patterned mask. As a result, the resist 403 having the same shape as the masking pattern is left over the plated base 402 (step S3).

Next, a layer 404 of the magnetic material is formed by plating over the other parts of the base 402 than the part covered by the resist 403 to form the magnetic layer 404 (step S4). After that, the resist 404 is removed by using a stripping liquid (step S5).

Then, by scraping off uniformly the part of the whole face as thick as the base 402 by milling or otherwise and thereby separating the projecting parts from one another, the magnetic core 312 having rods as stated above is formed (step S6).

Next, in order to insulate the magnetic core 312 having rods from the other layers stacked after that, a film 405 of an insulating material, such as alumina, is so formed over the magnetic core 312 having rods (step S7), and further an alumina layer 406 is grown (step S8).

Further, processing is done to flatten the rugged shape of the alumina layer 406 by chemical mechanical polish (CMP) (step S9).

As hitherto described, the magnetic core having rods and other elements can be fabricated by applications of a semiconductor process. In particular, when the magnetic layer to constitute the magnetic core is to be grown, low-cost plating can be used, and accordingly the fabrication cost of the magnetic field generating section itself can be reduced.

Another mode for carrying out the invention different from the foregoing will be described below.

Since this other mode for implementation is substantially similar to the preceding mode except that radiators are embedded between the rods of the magnetic core, the following description will focus solely on the difference.

Figure 10:
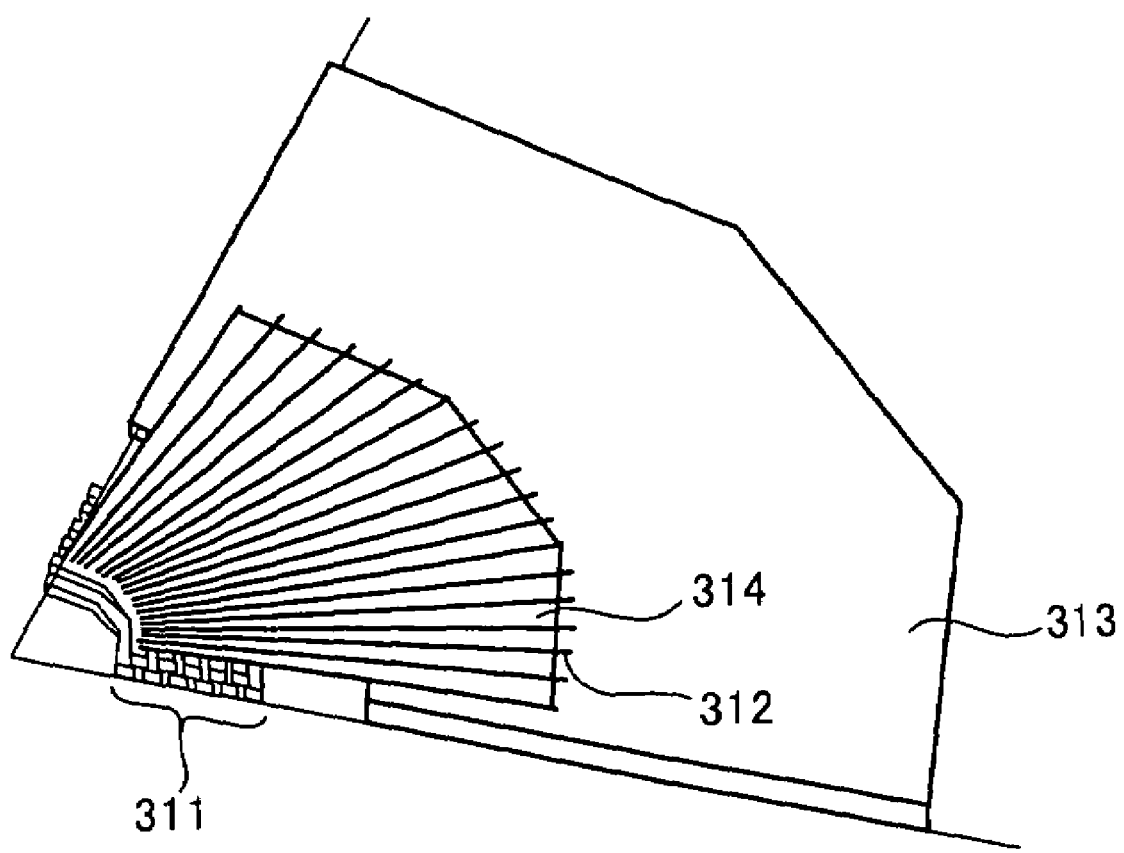
FIG. 10 shows a ¼ configuration of a magnetism generating section in another mode for implementation.

FIG. 10 shows a ¼ configuration of a magnetism generating section in another mode for implementation.

Figure 11:
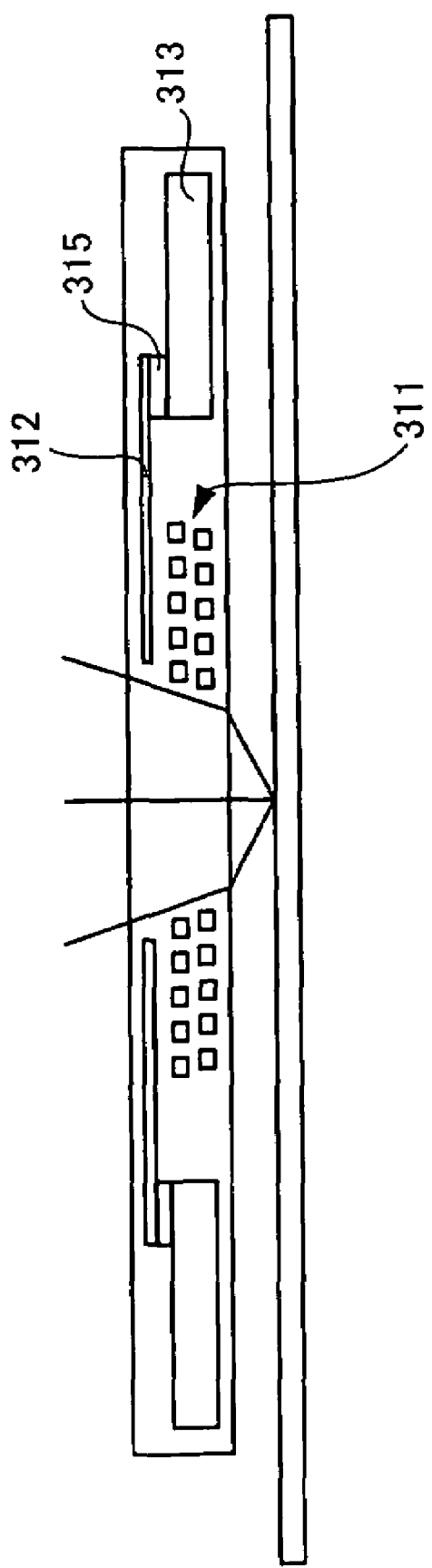
FIG. 11 shows a section of the magnetism generating section.

FIG. 11 shows a section of the magnetism generating section.

In the mode for implementation illustrated here, radiators 314 made of Cu are embedded between the above-described rods of the magnetic core 312. These radiators 314 constitute one example of inter-rod radiators in the contest of the present invention; they are formed by growing a Cu layer, instead of the alumina layer, at step S8 of the fabricating procedure charted in FIG. 9. Therefore, the above-mentioned alumina film intervenes between the magnetic core 312 and the radiators 314, which are thereby insulated from each other.

The radiators 314 between the rods of the magnetic core 312 are joined to the radiator 313 disposed around the coil 311 via a joining layer 315, and they can collect the heat generated by the magnetic core 312 and efficiently let it escape to the radiator 313 around the coil 311.

Although magnetic core elements in a substantially fixed rod shape are shown as examples for use in the above-described modes for implementation to illustrate magnetic rods in the context of the present invention, the magnetic rods in the meaning of the present invention can have some other shape, for instance of one gradually growing in thickness toward one end, if the maximum width is not more than twice the minimum width.

The invention claimed is:

1. A magnetic field generator comprising:
    an annular coil surrounding an inner hole, and
    a plurality of magnetic rods which are insulated from the coil, consist of a magnetic material, are arranged radially around the inner hole of the coil so as to overlap the coil and have a ratio of not greater than 2/1 between the maximum width and the minimum width.

2. The magnetic field generator according to claim 1, wherein the magnetic rods are made of a magnetic material having a saturated magnetic flux density of 1.5 (T) or more, and are 3 μm or more in thickness and 6 μm or more in width.

3. The magnetic field generator according to claim 1, wherein the magnetic rods have a length at least twice as great as the width of the coil from the line of the inner hole thereof to the outer line.

4. The magnetic field generator according to claim 1, wherein the total volume of the plurality of magnetic rods is smaller than the total volume of the spaces between the plurality of magnetic rods.

5. The magnetic field generator according to claim 1, wherein the magnetic rods have wider parts in the positions they overlap the coil.

6. The magnetic field generator according to claim 1, wherein the magnetic rods are made of a magnetic material having a magnetic permeability of 500 or more.

7. The magnetic field generator according to claim 1, wherein the magnetic rods are made of CoNiFe.

8. The magnetic field generator according to claim 1, wherein an extra-coil radiator to deprive the magnetic rods of heat is provided in thermal contact with the magnetic rods in a position where ⅙ or more of the outer diameter of the coil is opened from the outer edge of the coil.

9. The magnetic field generator according to claim 8, wherein the extra-coil radiator is made of copper.

10. The magnetic field generator according to claim 1, wherein there are further provided inter-rod radiators disposed between the plurality of magnetic rods, insulated from and being in thermal contact with the magnetic rods and intended to deprive the magnetic rods of heat.

11. The magnetic field generator according to claim 10, wherein the inter-rod radiators are made of copper.

12. The magnetic field generator according to claim 10, wherein there is further provided an extra-coil radiator, connected to the inter-rod radiators, that deprives the magnetic rods of heat via the inter-rod radiators in a position where ⅙ or more of the outer diameter of the coil is opened from the outer edge of the coil.

13. A photomagnetic information storage apparatus which accesses an information recording medium for information by using light and magnetic fields, the photomagnetic information storage apparatus comprising:
    a light source which emits light;
    a condensing lens that condenses the light emitted from the light source on the information recording medium;
    an annular coil surrounding an inner hole, disposed on the information recording medium side of the condensing lens and causing a magnetic field to be generated on the information recording medium in a position where the condensing lens condenses light; and
    a plurality of magnetic rods radially arranged centering on the inner hole of the coil between the coil and the condensing lens, insulated from the coil, and made of a magnetic material, the maximum width of each rod being not more than twice the minimum width.

* * * * *